United States Patent
Wang et al.

(10) Patent No.: US 8,971,266 B2
(45) Date of Patent: Mar. 3, 2015

(54) METHOD AND APPARATUS FOR CONVEYING DOWNLINK SCHEDULING SIGNALING

(75) Inventors: Yi Wang, Beijing (CN); Yuantao Zhang, Beijing (CN); Jie Zhang, Beijing (CN); Jianming Wu, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 13/528,038

(22) Filed: Jun. 20, 2012

(65) Prior Publication Data

US 2012/0275415 A1 Nov. 1, 2012

Related U.S. Application Data

(63) Continuation of application No. PCT/CN2010/075143, filed on Jul. 14, 2010.

(30) Foreign Application Priority Data

Dec. 23, 2009 (CN) .......................... 2009 1 0263607

(51) Int. Cl.
*H04W 4/00* (2009.01)
*H04W 52/58* (2009.01)
*H04L 1/00* (2006.01)
*H04W 52/04* (2009.01)
*H04W 28/04* (2009.01)

(52) U.S. Cl.
CPC ............. *H04W 52/58* (2013.01); *H04L 1/0041* (2013.01); *H04L 1/0061* (2013.01); *H04W 52/04* (2013.01); *H04W 28/04* (2013.01)
USPC ....................................................... 370/329

(58) Field of Classification Search
CPC ..... H04W 84/12; H04W 84/18; H04W 88/04; H04L 2012/5608

USPC .............. 370/310, 310.2, 315, 328, 329, 330, 370/349, 252
See application file for complete search history.

(56) References Cited

U.S. PATENT DOCUMENTS

| | | | |
|---|---|---|---|
| 8,218,663 B2 * | 7/2012 | Muharemovic et al. | 375/260 |
| 8,724,636 B2 * | 5/2014 | Chen et al. | 370/395.1 |
| 2009/0238121 A1 * | 9/2009 | Kotecha | 370/329 |

FOREIGN PATENT DOCUMENTS

| | | |
|---|---|---|
| CN | 101507348 A | 8/2009 |
| WO | 2008/024788 A2 | 2/2008 |

OTHER PUBLICATIONS

First Office Action issued for corresponding Chinese Patent Application No. 200910263607.8 dated May 31, 2012 with full English translation.
First Notification of Office Action issued for corresponding Chinese Patent Application No. 2010800603437, issued on Jul. 2, 2014, with an English translation.

* cited by examiner

*Primary Examiner* — Anh Ngoc Nguyen
(74) *Attorney, Agent, or Firm* — Myers Wolin, LLC

(57) ABSTRACT

A method and an apparatus for conveying downlink scheduling signaling. The method comprises: generating a plurality of masking sequences corresponding to a plurality of predetermined downlink scheduling information including downlink physical resource assignment indicating information or power assignment information for a Demodulation Reference Signal (DMRS); and selecting a corresponding masking sequence from the plurality of masking sequences based on downlink scheduling information to be notified to a User Equipment (UE), and masking a Cyclic Redundancy Check (CRC) of a corresponding downlink control channel of the user equipment with the selected masking sequence for transmission.

12 Claims, 10 Drawing Sheets

METHOD AND APPARATUS FOR CONVEYING DOWNLINK SCHEDULING SIGNALING

CROSS-REFERENCE TO RELATED APPLICATIONS

This application is a continuation of International Application No. PCT/CN2010/075143, filed on Jul. 14, 2010, now pending, which claims priority to Chinese Patent Application No. 200910263607.8, filed on Dec. 23, 2009, whereby the contents of each are herein wholly incorporated by reference.

FIELD OF THE INVENTION

The present invention relates to a wireless communication system, and particularly, to a method and an apparatus for conveying downlink scheduling signaling in the wireless communication system.

DESCRIPTION OF THE RELATED ART

With the freezing of the Long Term Evolution (LTE) Rel-8 system project of the Universal Mobile Telecommunications System (UMTS) started by the 3GPP, in order to develop the fourth generation mobile communications system (LTE-Advanced), the LTE Rel-9 system acting as a transition is also being studied.

In order to further improve the capacity of the Rel-8 system, the Rel-9 system adopts a double-layer beam-forming technology. Meanwhile, in order to realize a smoother transition to the LTE-Advanced (LTE-A) Rel-10 system, the design of the Rel-9 system considers the forward compatibility. For example, the pilot sequence used in the Rel-9 system for beam-forming may also be used in the LTE-A Rel-10 system for the Demodulation Reference Signal (DMRS), and the Rel-9 User Equipment (UE) and the Rel-10 UE can be scheduled simultaneously.

FIG. 1 illustrates a DMRS pattern of Rel-9 UE under a double-layer beam-forming transmission mode. In each Rel-9 sub-frame, the pilots occupy 12 Resource Elements (REs) in the $6^{th}$, $7^{th}$, $13^{th}$ and $14^{th}$ OFDM symbols of the Physical Resource Block (PRB). The pilots in the $1^{st}$ and $2^{nd}$ layers occupy the same PRB and they are distinguished by the orthogonal code with a length of 2. In the Rel-10 system, when the number of layers (i.e., rank) of the data streams is 1 or 2, the DMRS pattern of the Rel-10 system is the same as that of the Rel-9 system. When the number of layers of the data streams is more than 2, the DMRSs of the Rel-10 system occupy 12 additional REs for transmitting the DMRSs of the Rel-10 system in the $3^{rd}$ and $4^{th}$ layers. FIG. 3 illustrates a DMRS pattern in the Rel-10 system when the number of layers of the data streams is more than 2.

As can be seen from FIGS. 2 and 3, when the Rel-10 UE whose number of layers of the data streams is more than 2 and the Rel-9 UE transmit the data in a multi-user MIMO mode, the DMRSs in the $3^{rd}$ and $4^{th}$ layers of the Rel-10 system will interfere with the user data of the Rel-9 system.

Thus when the transmitting antennas of base station of the Rel-10 system increases, the layers of spatial multiplexing supported by the Rel-10 system also increases, and the physical resources required by the DMRSs of the Rel-10 system are multiplied as compared with those required for the Rel-9 system. In case the same physical resource is assigned to the Rel-9 UE and the Rel-10 UE to be used by them simultaneously, if the DMRSs of the Rel-10 system occupy more parts of the physical resource than the DMRSs of the Rel-9 system, the Rel-9 UE will be interfered with by the DMRSs of the Rel-10 system when the Rel-9 UE receives downlink data, so the performance of the Rel-9 UE is obviously degraded, which is a problem still not solved.

The above technical background is just introduced for the convenience of clearly and completely describing the technical solutions of the present invention, in order for a person skilled in the art to understand them easily. Although these solutions are illustrated in the Background Art of the present invention, it shall not be deemed that all the above contents are known to a person skilled in the art.

The literatures related to the background art are listed as follows, and incorporated herein by reference as if they were completely described herein.

(1) a US patent application with a publication No. US 2009176463 A1;

(2) a US patent application with a publication No. US 2009196204 A1;

(3) a US patent application with a publication No. US 2009197542 A1;

(4) a US patent application with a publication No. US 2009249027 A1;

(5) a US patent application with a publication No. US 2009270095 A1; and (6) a US patent application with a publication No. US 2009257449 A1.

SUMMARY OF THE INVENTION

In view of the problem in the prior art, an object of the present invention is to provide a method and an apparatus for conveying downlink scheduling signaling, so as to prevent any interference from other user among multiple users.

According to an aspect of the present invention, a method for conveying downlink scheduling signaling is provided, comprising the steps of: generating a plurality of masking sequences corresponding to a plurality of predetermined downlink scheduling information including downlink physical resource assignment indicating information or power assignment information for a Demodulation Reference Signal (DMRS); and selecting a corresponding masking sequence from the plurality of masking sequences based on downlink scheduling information to be notified to a User Equipment (UE), and masking a Cyclic Redundancy Check (CRC) of a corresponding downlink control channel of the user equipment with the selected masking sequence for transmission.

According to another aspect of the present invention, an apparatus for conveying downlink scheduling signaling is provided, comprising: a masking sequence generating unit for generating a plurality of corresponding masking sequences based on a plurality of predetermined downlink scheduling information including downlink physical resource assignment indicating information or power assignment information for a DMRS; and a masking processing unit for selecting a corresponding masking sequence from the plurality of masking sequences based on downlink scheduling information to be notified to a UE, and masking a CRC of a corresponding downlink control channel of the UE with the selected masking sequence for transmission.

According to another aspect of the present invention, a method for conveying downlink scheduling signaling is provided, comprising the steps of: receiving a CRC masked with a masking sequence, from a downlink control channel of a base station; de-masking the received CRC of the downlink control channel, and determining the masking sequence masking the CRC of the downlink control channel; and obtaining downlink scheduling information for the determined masking sequence based on a pre-stored correspondence relationship between a plurality of masking sequences and a plurality of downlink scheduling information, wherein the downlink scheduling information comprises downlink physical resource assignment indicating information or power assignment information for a DMRS.

According to another aspect of the present invention, an apparatus for conveying downlink scheduling signaling is provided, comprising: a receiving unit for receiving a CRC, masked with a masking sequence, from a downlink control channel of a base station; a de-masking processing unit for de-masking the received CRC of the downlink control channel, and determining the masking sequence masking the CRC of the downlink control channel; and an obtaining unit for obtaining downlink scheduling information for the determined masking sequence based on a pre-stored correspondence relationship between a plurality of masking sequences and a plurality of downlink scheduling information, wherein the downlink scheduling information comprises downlink physical resource assignment indicating information or power assignment information for a DMRS.

The method and apparatus for conveying downlink scheduling signaling of the present invention carry the specific downlink control signaling by masking the CRC of the PDCCH with a masking sequence, so as to transmit more downlink control information without adding any additional signaling overhead or changing the PDCCH format. Especially, the present invention can be applied to the multi-user MIMO transmission mode of the Rel-9 and Rel-10 systems, so as to effectively avoid the DMRS of the Rel-10 system from interfering with the data of the Rel-9 UE and the Rel-10 UE, or effectively indicate the power assignment information for the DMRS to each user, thereby improving the system performance.

In order to achieve the aforementioned and related objects, the present invention includes the features sufficiently described later and specifically pointed out in the claims. The following descriptions and drawings elaborate the specific exemplary embodiments of the present invention in detail. However, those embodiments are just some of the embodiments capable of using the principle of the present invention. Other objects, advantages and novel features of the present invention will be clearer according to the following detailed descriptions of the present invention with reference to the drawings.

DETAILED DESCRIPTION OF THE PREFERRED EMBODIMENTS

The technical solutions of the embodiments of the present invention will be described clearly and completely as follows with reference to the drawings of the embodiments of the present invention. Apparently, the described embodiments are just a part of the embodiments of the present invention rather than all the embodiments. Any other embodiment obtained by a person skilled in the art based on the embodiments of the present invention without paying creative effort shall fall within the protection scope of the present invention.

Herein to be noted, in order to avoid the present invention from being vague due to unnecessary details, the drawings only illustrate device structures and/or processing steps closely related to the solutions according to the present invention, while omitting other details not so closely related.

Figure 1:
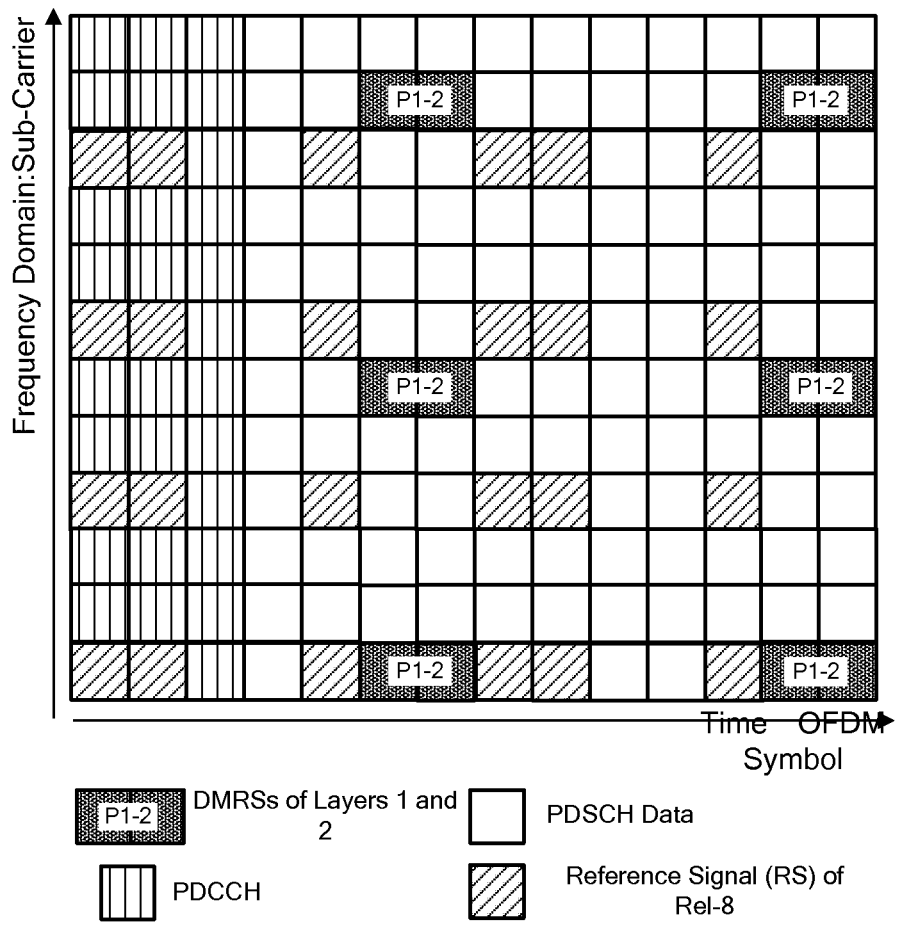
FIG. 1 illustrates a schematic diagram of DMRSs in a double-layer beam-forming transmission mode of the Rel-9 UE.
Figure 2:
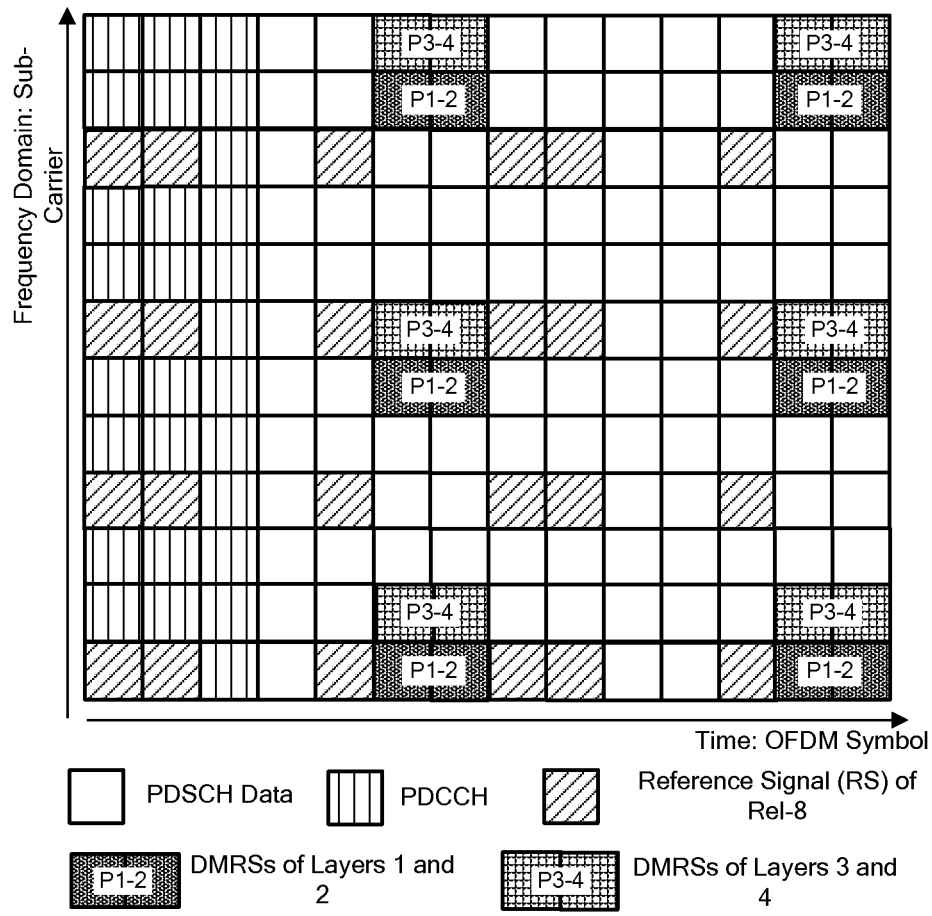
FIG. 2 illustrates a schematic diagram of DMRSs of the Rel-10 UE when the number of transmission layers is more than 2.

In the Rel-10 system, depending on the number of antennas configured at the base station side and the number of layers of the used data streams, the physical resource occupied by the DMRSs may be variable. For example, when the rank is less than or equal to 2, the DMRS pattern of the Rel-10 UE is illustrated in FIG. 1, and when the rank is more than 2, the DMRS pattern of the Rel-10 UE is illustrated in FIG. 2. It can be seen that when the rank is less than or equal to 2, the DMRSs occupy 12 REs in each physical resource block, and when the rank is more than 2, the DMRSs occupy 24 REs in each physical resource block. Thus, the physical resource carrying the downlink data in the Rel-9 system may conflict with the DMRS physical resource in the Rel-10 system.

In order to solve the resource conflict, the present invention proposes that the base station may transmit the Physical Downlink Shared Channel (PDSCH) data to the Rel-9 UE on the physical resource which is not interfered with (e.g., the REs not occupied by the $3^{rd}$ and $4^{th}$ layers of the Rel-10 system), and the base station may notify the information to the Rel-9 UE through the Physical Downlink Control Channel (PDCCH), so that during the demodulation, the Rel-9 UE needs not to consider the data carried by the physical resource which is interfered with. In addition, when transmitting data, the Rel-9 UE can avoid the physical resource which is interfered with by the DMRSs of the Rel-10 system, i.e., the Rel-9 UE does not transmit data on the physical resource which is interfered with by the DMRSs of the Rel-10 system.

For this purpose, the present invention provides a method for conveying downlink scheduling signaling, which uses different masks to represent the specific downlink scheduling information including physical resource assignment indicating information, masks a Cyclic Redundancy Check (CRC) of the PDCCH with the masks and sends to the UE.

Figure 3:
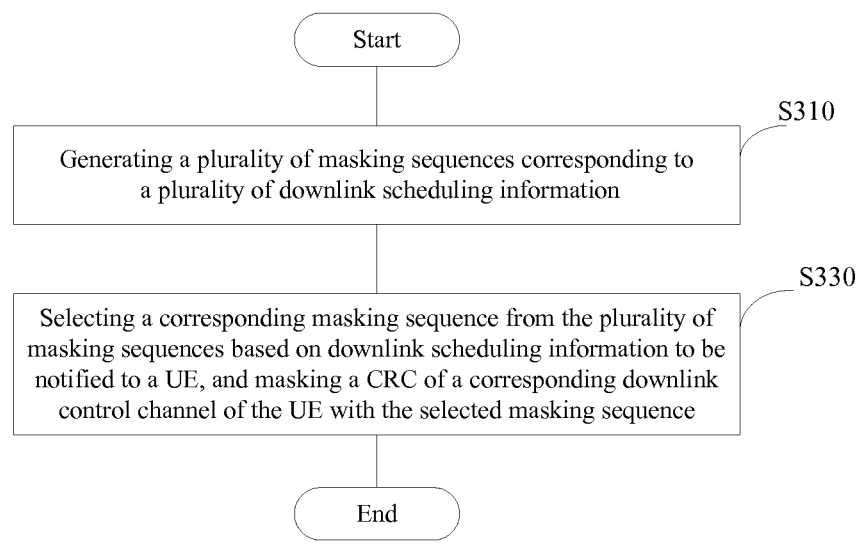
FIG. 3 illustrates a flowchart of a method for conveying downlink scheduling signaling at a base station side according to an embodiment of the present invention.

FIG. 3 is a flowchart of a method for conveying downlink scheduling information at a base station side according to an embodiment of the present invention. As illustrated in FIG. 3, the method comprises:

Step S310: generating a plurality of masking sequences corresponding to a plurality of predetermined downlink scheduling information.

At the base station side, the specific downlink scheduling information may be quantized in advance, for example, M different values may be used to represent M types of different downlink scheduling information. The base station side may generate M masking sequences $m^i=[m_0^i, m_1^i, \ldots m_L^i], i=1, 2, \ldots M$ one-by-one corresponding to the M types of downlink scheduling information, wherein M is an integer more than or equal to 1.

Preferably, the downlink scheduling information may include the downlink physical resource assignment indicating information to indicate the conditions of physical resource assignment. The downlink physical resource assignment indicating information for example may be downlink physical resource reservation indicating information for preventing interference when the Rel-9 UE and the Rel-10 UE transmit in the multi-user MIMO mode, or downlink physical resource assignment information (e.g., downlink pilot sequence, DMRS pattern, etc.) related to DMRS under various antenna configurations in the Rel-10 system. But the downlink physical resource assignment indicating information is not limited thereto, and may be other information so long as the information enables the Rel-9 UE to know how to avoid the interference from the Rel-10 DMRS.

Preferably, the mask sequence generated by the base station side is the 0/1 binary sequence, and the length thereof may be the same as or different from the length L of the CRC of the PDCCH. In the LTE/LTE-A system, L=16.

Step S330: selecting a corresponding masking sequence from the plurality of masking sequences based on downlink scheduling information to be notified to a UE, and masking the CRC of the corresponding PDCCH of the UE with the selected masking sequence for transmission.

This step performs a scrambling process of the CRC of the corresponding PDCCH of the UE using the selected masking sequence, e.g., masking the CRC of the PDCCH with the masking sequence through an exclusive OR operation for transmission.

Through the above flow, the base station side can transmit downlink scheduling information (e.g., the downlink physical resource assignment information related to the pilot) to each UE through the PDCCH. After receiving corresponding information, the UE may demodulate the PDSCH data based on the downlink physical resource assignment information related to the pilot, so that the Rel-9 UE can avoid the additional resources occupied by the DMRSs of the Rel-10 UE, thereby preventing the interference from the Rel-10 UE.

Although the above descriptions only give two steps, the present invention is not limited thereto. In practical application, other steps may be added before, between or after the above two steps, without influencing the transmission of the specific downlink scheduling information of the present invention.

In the embodiment of the present invention, the downlink scheduling information is not limited to the downlink physical resource assignment indicating information, and may be any other downlink control information currently not carried by the PDCCH, such as downlink physical resource assignment information related to the Rel-9 single-layer or double-layer beam-forming and power assignment information for the DMRS. Thus by carrying the specific downlink control signaling by masking the CRC of the PDCCH with the masking sequence, more downlink control information can be transmitted without adding any additional signaling overhead or changing the PDCCH format.

When the Rel-10 UE transmits in the multi-antenna MIMO mode, and/or when the DMRSs ensure orthogonality of DMRSs corresponding to various data streams through Frequency Division Multiplexing (FDM) or Time Division Multiplexing (TDM), the power ratio between the DMRS corresponding to each data stream and the PDSCH data may be variable. In order to ensure that the UE side correctly demodulates the PDSCH data, the base station shall notify the UE side of the power ratio between the DMRS and the PDSCH data. The DMRS power assignment information (e.g., the power ratio between the DMRS and the PDSCH data, the DMRS power assignment, etc.) which enables the UE to obtain the power ratio between the DMRS and the PDSCH data can also be transmitted by masking the CRC of the PDCCH with masks.

Figure 4:
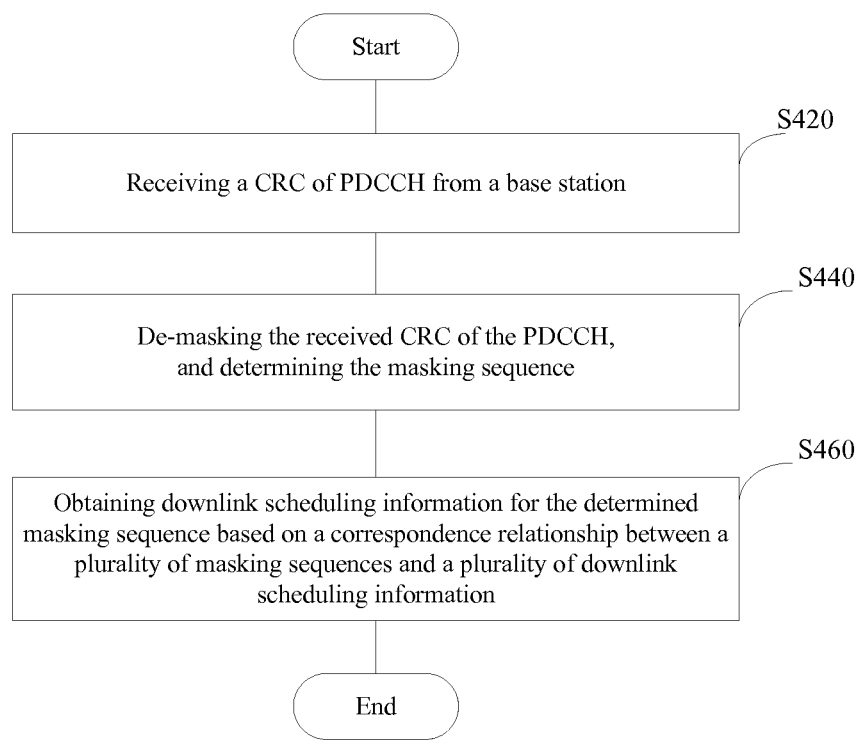
FIG. 4 illustrates a flowchart of a method for conveying downlink scheduling signaling at a user side according to an embodiment of the present invention.

FIG. 4 illustrates a method for conveying downlink scheduling signaling at the UE side, wherein the method comprises:

Step 420: receiving a CRC of PDCCH from a base station.

Step 440: de-masking the received CRC of the PDCCH, and determining the masking sequence masking the CRC of the PDCCH.

Each UE may perform a blind detection of the masking sequences according to the received CRC of the PDCCH, so as to determine the masking sequence used by the UE from M masking sequences. The blind detection of the masking sequences for example may be, but not limited to, a traversal search for the M masking sequences in the received CRC.

The M masking sequences may be pre-stored in each UE, or generated in each UE based on a generation algorithm the same as that used to generate M masking sequences in the base station.

Step 460: obtaining downlink scheduling information for the determined masking sequence based on a correspondence relationship between a plurality of masking sequences and a plurality of downlink scheduling information.

Each UE may pre-store the one-by-one correspondence relationship between M masking sequences and M types of downlink scheduling information, and determine the content of the downlink scheduling information transmitted by the base station side to the UE according to the one-by-one correspondence relationship and the determined masking sequence. Each UE may demodulate the data in the PDSCH according to the content of the downlink scheduling information.

The method and apparatus for conveying downlink scheduling signaling provided by the present invention carry the specific downlink control signaling by masking the CRC of the PDCCH with a masking sequence, so as to transmit more downlink control information without adding any additional signaling overhead or changing the PDCCH format. The present invention can be applied to the multi-user MIMO transmission mode of the Rel-9 and Rel-10 systems, so as to effectively avoid the DMRS of the Rel-10 system from interfering with the data of the Rel-9 UE, thereby improving the system performance. When being applied to the multi-user MIMO transmission mode of the Rel-10 system, the present invention can effectively avoid the user DMRS in the multi-user MIMO of the Rel-10 system from interfering with other user data, and enable the UEs to perform a processing of interference suppression or interference deletion therebetween using the DMRS information, thereby improving the system performance.

Next, examples are given to describe the embodiments of the present invention.

Figure 5:
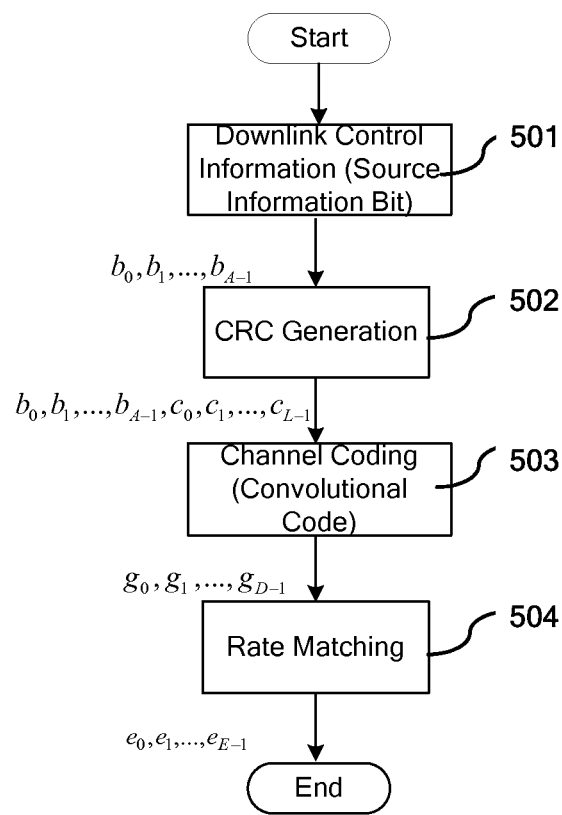
FIG. 5 illustrates the basic flow of modulation coding in the prior art.

In order to better understand the examples of the present invention, the basic flow of modulation coding of the PDCCH for carrying the downlink control signaling in the prior art is firstly described as follows. As illustrated in FIG. 5, the flow specifically includes:

Step 501: generating the required downlink control signaling (i.e., source information bit) according to the selected transmission mode, such as a double-layer beam-forming transmission mode in the Rel-9 system.

The downlink control signaling is represented by 0/1 bits of a certain length as $b_0, b_1, b_2, b_3, \ldots, b_{A-1}$, wherein A is the length of the downlink control signaling.

Step 502: performing a CRC coding of the downlink control signaling generated in step 501.

After CRC coding, a new 0/1 bit sequence can be obtained: $b_0, b_1, \ldots, b_{A-1}, c_0, c_1, \ldots, c_{L-1}$, wherein $c_0, c_1, \ldots, c_{L-1}$ is the CRC, and L is the length thereof.

Step 503: performing a channel coding of the sequence generated in step 502 (i.e., convolutional coding).

After convolutional coding, a new 0/1 bit sequence can be obtained: $g_0, g_1, \ldots, g_{D-1}$, wherein D is the length after convolutional coding.

Step 504: performing a rate matching for the sequence generated in step 503 to obtain a new 0/1 bit sequence: $e_0, e_1, \ldots, e_{E-1}$, wherein E is the length thereof.

Figure 6:
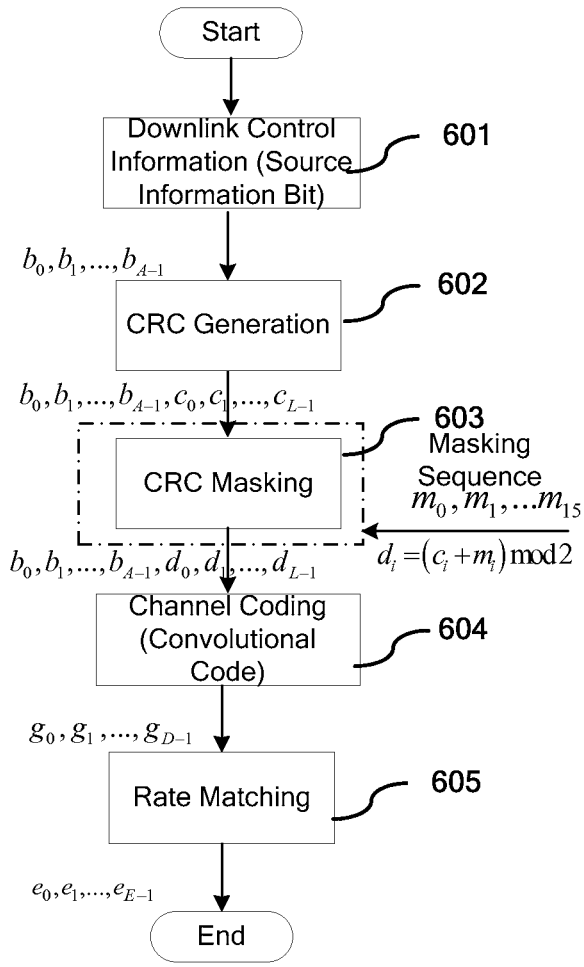
FIG. 6 illustrates a flowchart of a method for conveying downlink scheduling signaling at base station side according to another embodiment of the present invention.

In an example of a method for conveying downlink scheduling signaling proposed by the present invention, improvements are made to the flow of modulation coding illustrated in FIG. 5. FIG. 6 gives a specific flow applied to the Rel-9 system to convey the downlink scheduling signaling. As illustrated in FIG. 6, the flow comprises the steps of:

Step 601: generating the required downlink control signaling according to the double-layer beam-forming transmission format 2B of the Rel-9 system, wherein the downlink control signaling is represented by 0/1 bits of a certain length as $b_0, b_1, b_2, b_3, \ldots, b_{A-1}$.

Before step 601, the base station side may firstly perform the step of masking sequence generation: generating two different masking sequences $m^1$ and $m^2$ at the base station side, with their lengths equal to length L of the CRC, L=16. The two masking sequences for example may be $m^1$=0000000000000000, and $m^2$=0000000000000001. It may be assumed that $m^1$ indicates that, when receiving the PDSCH, the Rel-9 UE receives in the single user MIMO mode without considering the interference of 12 REs additionally occupied by the DMRS of the Rel-10 UE; and $m^2$ indicates that, when receiving the PDSCH, the Rel-9 UE does not receive the data transmitted on the 12 REs additionally occupied by the DMRS of the Rel-10 UE, i.e., the resources of the 12 REs are reserved to avoid interference.

The step of masking sequence generation may be performed before the following step 602 or step 603.

Step 602: performing a CRC coding of the downlink control signaling generated in step 601 to obtain a new 0/1 bit sequence $b_0, b_1, \ldots, b_{A-1}, c_0, c_1, \ldots, c_{L-1}$, wherein $c_0, c_1, \ldots, c_{L-1}$ is the CRC.

Step 603: selecting $m^1$ or $m^2$ to scramble the CRC sequence $c_0, c_1, \ldots, c_{L-1}$, depending on whether it is necessary to notify the Rel-9 UE to reserve additional 12 REs for the DMRSs of the Rel-10 UE. In case it is necessary to notify the Rel-9 UE to reserve additional 12 REs, performing an exclusive OR operation on the CRC sequence $c_0, c_1, \ldots, c_{L-1}$ using the sequence $m^2$: $d_i = (c_i + m_i^2) \mod 2$, wherein $m^2$=0000 000000000001. In case it is not necessary to notify the Rel-9 UE to reserve additional 12 REs, performing an exclusive OR operation on the CRC sequence $c_0, c_1, \ldots, c_{L-1}$ using the sequence $m^1$: $d_i = (c_i + m_i^1) \mod 2$, wherein $m^1$=0000000000000000.

After the scrambling process, a new sequence $b_0, b_1, \ldots, b_{A-1}, d_0, d_1, \ldots, d_{L-1}$ is generated.

Step 604: performing a convolutional coding of the sequence generated in step 603 to obtain a new 0/1 bit sequence $g_0, g_1, \ldots, g_{D-1}$.

Step 605: performing a rate matching for the sequence generated in step 604 to obtain a new 0/1 bit sequence: $e_0, e_1, \ldots, e_{E-1}$.

Figure 7:
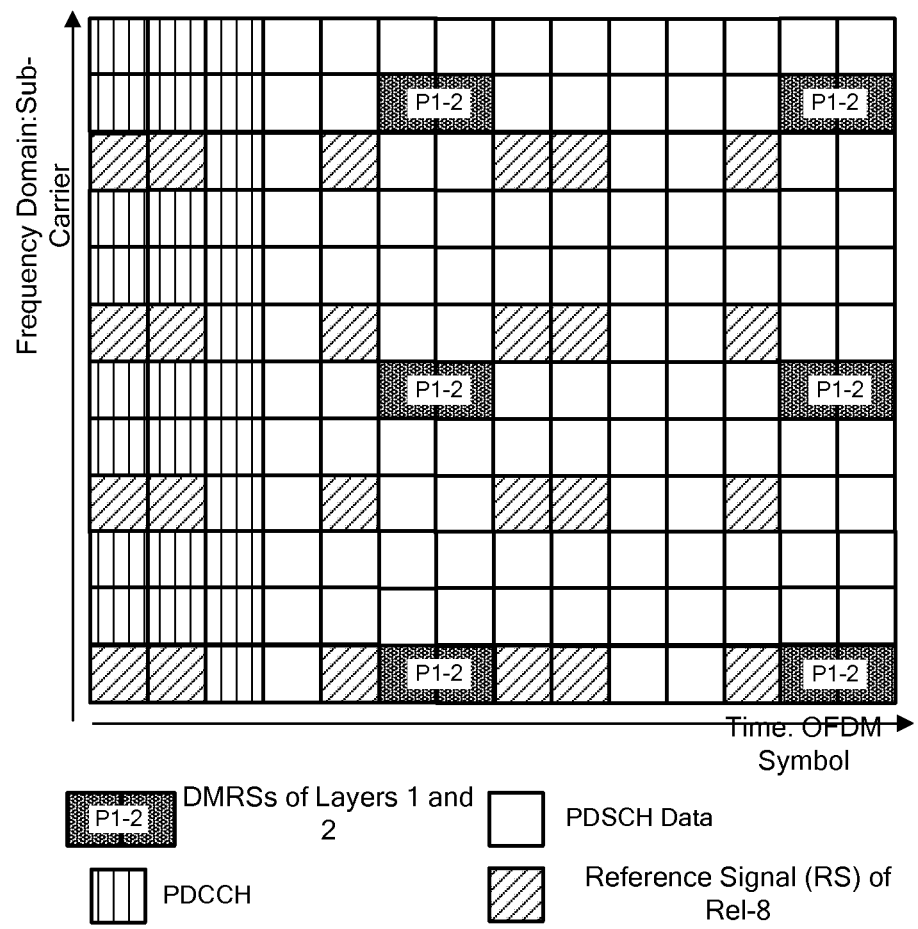
FIG. 7 illustrates a schematic diagram of DMRSs based on which the Rel-9 UE demodulates according to a type of downlink scheduling information.
Figure 8:
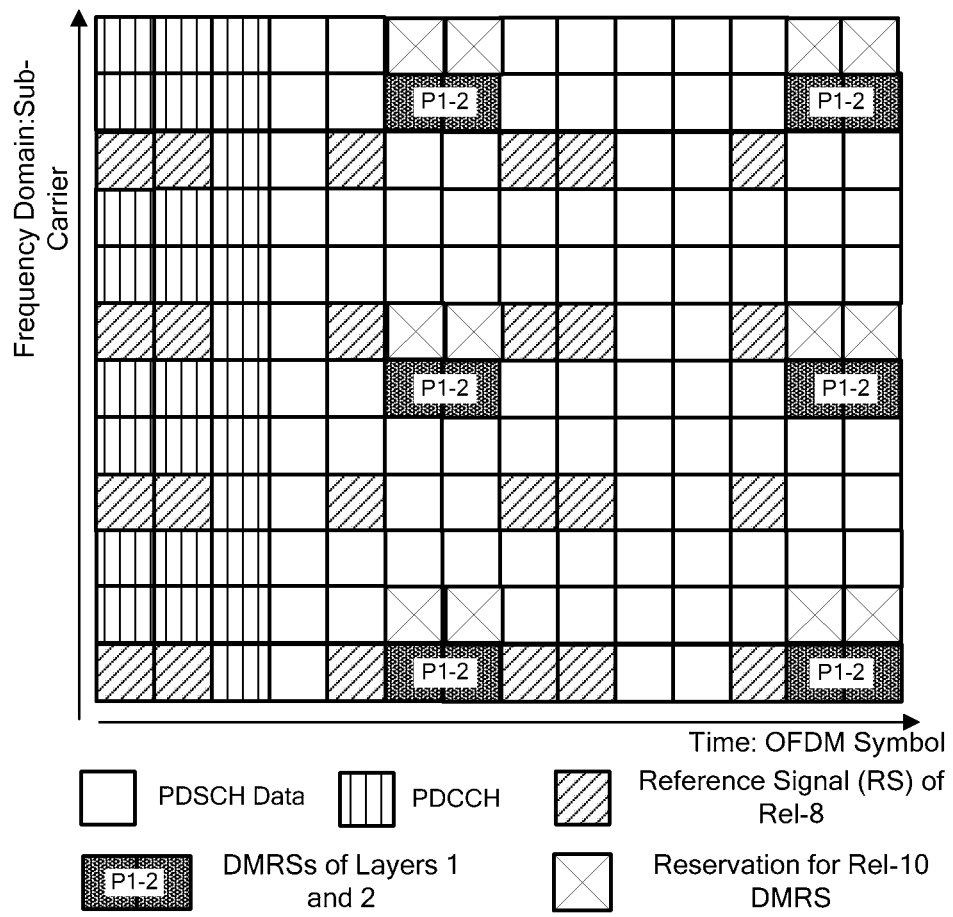
FIG. 8 illustrates a schematic diagram of DMRSs based on which the Rel-9 UE demodulates according to another type of downlink scheduling information.

After receiving the CRC of the PDCCH from the base station, the Rel-9 UE may de-mask to determine the masking sequence of the UE. Further, the Rel-9 UE obtains the downlink scheduling information corresponding to the determined masking sequence according to the pre-stored correspondence relationship between a plurality of masking sequences and a plurality of downlink scheduling information. For example, if the masking sequence determined by the Rel-9 UE is $m^1$, the Rel-9 UE demodulates the PDSCH data according to the pilot pattern as illustrated in FIG. 7 during the decoding, without reserving additional 12 REs for the Rel-10 DMRSs. If the masking sequence determined by the Rel-9 UE is $m^2$, the Rel-9 UE demodulates the PDSCH data according to the pilot pattern as illustrated in FIG. 8, and reserves additional 12 REs for the Rel-10 DMRSs without receiving the data on the 12 REs.

In case the flow illustrated in FIG. 6 is applied to the Rel-10 system, the flow is specifically described as follows:

Step 601: generating the required downlink control signaling according to the downlink transmission signaling format of the Rel-10 system, wherein the downlink control signaling is represented by 0/1 bits of a certain length as $b_0, b_1, b_2, b_3, \ldots, b_{A-1}$.

Before step 601, the base station side may firstly perform the step of masking sequence generation: generating two different masking sequences $m^1$ and $m^2$ at the base station side, with their lengths equal to length L of the CRC, L=16. The two masking sequences for example may be $m^1$=0000000000000000, and $m^2$=0000000000000001. The two masking sequences represent two different downlink scheduling information such as two resource reservation indicating information. It may be assumed that $m^i$ indicates that, when receiving the PDSCH, the Rel-10 UE considers that the DMRSs transmitted by the base station occupy 12 REs in each PRB, and only receives information on the 12 REs as pilot information when reiceiving; while $m^2$ indicates that, when receiving the PDSCH, the Rel-10 UE considers that the DMRSs transmitted by the base station occupy 24 REs in each PRB, and receives the information on 12 predetermined REs as pilot information without receiving the information transmitted on the 12 additional REs, i.e., the information transmitted on the 12 additional REs is not taken as the data of the Rel-10 UE.

The step of masking sequence generation may be performed before the following step 602 or step 603.

Step 602: performing a CRC coding of the downlink control signaling generated in step 601 to obtain a new 0/1 bit sequence $b_0, b_1, \ldots, b_{A-1}, c_0, c_1, \ldots, c_{L-1}$, wherein $c_0, c_1, \ldots, c_{L-1}$ is the CRC.

Step 603: selecting $m^1$ or $m^2$ to scramble the CRC sequence $c_0, c_1, \ldots, c_{L-1}$, according to the number of REs (12 or 24 REs) occupied by the DMRSs transmitted by the base station. In case the DMRSs transmitted by the base station occupy 24 REs, performing an exclusive OR operation on the CRC sequence $c_0, c_1, \ldots, c^{L-1}$ using the sequence $m^2$: $d_i = (c_i + m_i^2)$ mod2, wherein m²=0000 000000000001. After the masking, a new sequence $b_0, b_1, \ldots, b_{A-1}, d_0, d_1, \ldots, d_{L-1}$ is generated.

Step 604: performing a convolutional coding of the sequence generated in step 603 to obtain a new 0/1 bit sequence $g_0, g_1, \ldots, g_{D-1}$.

Step 605: performing a rate matching for the sequence generated in step 604 to obtain a new 0/1 bit sequence: $e_0, e_1, \ldots, e_{E-1}$.

Based on the above embodiment of the present invention, under the Mulitple-User MIMO (MU-MIMO) transmission mode, the base station is enabled to notify the UE of the transmitted pilot pattern, and the UE can perform corresponding data demodulation according to the notified pilot pattern. Through the PDCCH, the base station may notify the Rel-10 UE of the information related to the physical resource occupied by the DMRSs, thereby avoiding the DMRSs of the UE from interfering with other user data, and promoting the UE to perform corresponding interference suppression or interference deletion.

The above descriptions only represent two downlink scheduling information with $m^1$ and $m^2$. In practical application, the downlink scheduling information is not limited to the above two downlink physical resource assignment indicating information, and may be any downlink control information currently not carried by the PDCCH, such as the power assignment information for the DMRS.

The apparatus for executing the method of the present invention will be described as follows.

Figure 11:
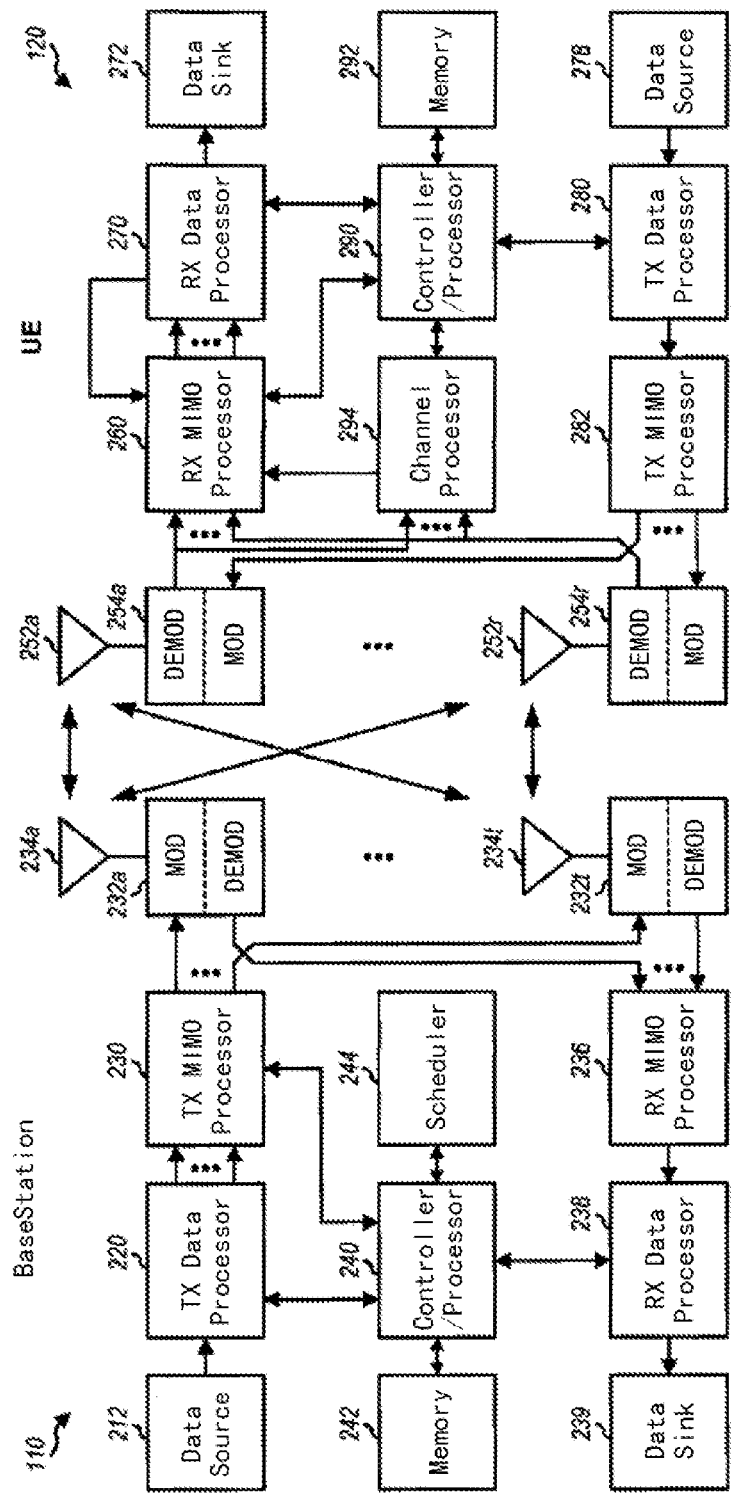
FIG. 11 illustrates the structure block diagrams of a base station and a UE in the prior art.

FIG. 11 illustrates the design block diagrams of a base station and a UE in the wireless communication system. As illustrated in FIG. 11, a base station 110 is provided with a plurality of (T) antennas 234a-234t, and a UE 120 is provided with a plurality of (R) antennas 252a-252r. Each antenna of the base station and the UE may be a physical antenna or an antenna array. In the base station 110, a TX data processor 220 may receive the data from a data source 212, process the received data based on one or more modulation and coding schemes (e.g., coding and symbol mapping), and provide data symbol and/or pilot symbol. A TX MIMO processor 230 may perform a spatial processing of the data symbol and the pilot symbol, and provide T symbol streams to T modulators (MOD) 232a-232t. Each MOD 232 can modulate the symbol stream (e.g., digital-to-analogue conversion, filtering, amplification, up-conversion, etc.) and generate a downlink signal. The T downlink signals from MOD 232a-232t may be transmitted via antennas 234a-234t, respectively. In the UE 120, R antennas 252a-252r can receive T downlink signals from the base station 110, and provide the received signals to demodulators (DEMOD) 254a-254r. Each DEMOD demodulates the received signal (e.g., filtering, amplification, down-conversion, digitization, etc.) to obtain data symbol or pilot symbol. Each DEMOD provides the data symbol to a RX MIMO processor 260, and provides the pilot symbol to a channel processor 294. The channel processor 294 can estimate the response of a wireless channel from the base station 110 to the UE 120 based on the pilot symbol, and provide channel estimation to the RX MIMO processor 260. The RX MIMO processor 260 may perform a MIMO detection of the received data symbol using the channel estimation, and provide the detected symbol. An RX data processor 270 processes the detected data (e.g., symbol de-mapping and decoding) and provides the decoded data to a data sink 272. The UE 120 may estimate the channel condition and determine the channel state information. The channel state information and the data from the data source 278 may be processed by a TX data processor 280 (e.g., coding and symbol mapping), spatially processed by a TX MIMO processor 282, and modulated by MOD 254a-254r to generate R uplink signals, which may be transmitted via antennas 252a-252r. In the base station 110, the R uplink signals from the UE 120 may be received by antennas 234a-234t, demodulated by DEMOD 232a-232t, spatially processed by the RX MIMO processor 236, and further processed by the RX data processor 238 (e.g., symbol de-mapping and decoding), so as to recover the channel state information and the data transmitted by the UE 120, and provide them to a data sink 239. A controller/processor 240 may control the data transmission to/from the UE 120 based on the received channel state information. Controllers/processors 240 and 290 may instruct operations on the base station 110 and the UE 120, respectively. Memories 242 and 292 may store data and program codes for use by the base station 110 and the UE 120, respectively. A scheduler 244 may select the UE 120 and/or other UE for an uplink and/or downlink data transmission based on the channel state information received from all the UEs.

Figure 9:
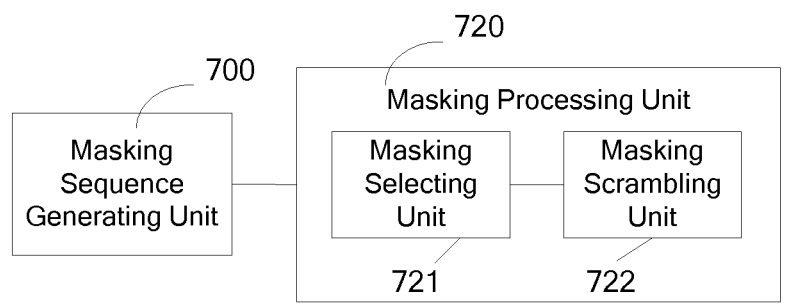
FIG. 9 illustrates a structure block diagram of a base station for conveying downlink scheduling signaling according to an embodiment of the present invention.

In the embodiment of the present invention, some structures in the base station and the UE are improved to implement the method of the present invention. FIG. 9 illustrates a structure block diagram of a base station for conveying downlink scheduling signaling according to an embodiment of the present invention. In order to avoid the present invention from being vague due to unnecessary details, FIG. 9 only illustrates structures closely related to the solutions according to the present invention. As illustrated in FIG. 9, the base station may include:

a masking sequence generating unit 700 for generating a plurality of corresponding masking sequences based on a plurality of predetermined downlink scheduling information. The downlink scheduling information for example may include downlink physical resource assignment indicating information or power assignment information for DMRS; and a masking processing unit 720 for selecting a corresponding masking sequence from the plurality of masking sequences based on downlink scheduling information to be notified to a UE, and masking a CRC of corresponding PDCCH of the UE with the selected masking sequence for transmission. Preferably, the masking sequences generated at the base station side are 0/1 binary sequences with their lengths equal to length L of the CRC of the PDCCH, and they also may have different lengths. In the LTE/LTE-A system, L=16.

Preferably, the masking processing unit 720 may further include a masking selecting unit 721 for selecting a corresponding masking sequence from the plurality of masking sequences based on downlink scheduling information to be notified to a UE; and a masking scrambling unit 722 for performing a scrambling process on the CRC of the corresponding PDCCH of the UE using the selected masking sequence.

In one embodiment of the present invention, the masking sequence generating unit 700 and the masking processing unit 720 for example may be provided in the TX data processor as illustrated in FIG. 11.

Figure 10:
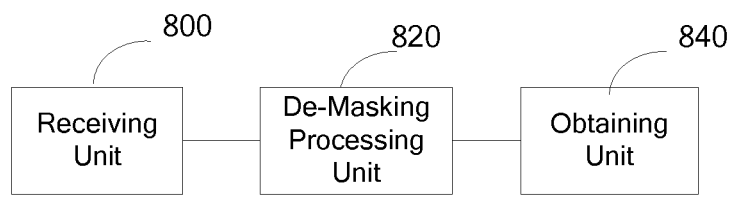
FIG. 10 illustrates a structure block diagram of a UE for conveying downlink scheduling signaling according to an embodiment of the present invention.

FIG. 10 illustrates a structure block diagram of a UE for conveying downlink scheduling signaling according to another embodiment of the present invention, wherein the UE includes:

A receiving unit 800 for receiving a CRC of PDCCH from a base station. The CRC is masked with a masking sequence corresponding to the downlink scheduling information pre-notified to the UE, wherein the downlink scheduling information may include downlink physical resource assignment indicating information or power assignment information for a DMRS. The downlink physical resource assignment indicating information may include at least: one of physical resource reservation information and a pattern of the DMRS. The receiving unit for example is UE antenna.

A de-masking processing unit 820 for de-masking the received CRC of the PDCCH, and determining the masking sequence masking the CRC of the PDCCH. For example, the de-masking processing unit 820 may perform a blind detection of the masking sequences according to the received CRC of the PDCCH, so as to determine the masking sequence used by the UE from M masking sequences. The blind detection of the masking sequences for example may be, but not limited to, a traversal search for the M masking sequences in the received CRC. The de-masking processing unit 820 for example may be provided in the RX data processor of the UE.

An obtaining unit 840 for obtaining downlink scheduling information for the determined masking sequence based on a pre-stored correspondence relationship between a plurality of masking sequences and a plurality of downlink scheduling information. The obtaining unit 840 may also be provided in the RX data processor of the UE. The RX data processor may provide downlink scheduling information corresponding to the received masking sequence to the controller/processor 290 of the UE, which controls the demodulators of the UE to demodulate the data. Thus, each UE can demodulate the data of the PDSCH according to the downlink scheduling information determined by the obtaining unit 840.

It shall be understood that each of the parts of the present invention may be implemented by hardware, software, firmware, or combination thereof. In the above embodiments, all or a part of steps can be implemented through software or firmware stored in a memory and executable by an appropriate instruction execution system, for example, by instructing relevant hardware through a program that may be stored in a computer readable storage medium, such as ROM/RAM, magnetic disk, optical disk, etc.

Any process, method description or block in the flowcharts or described in other ways can be understood as including one or more modules, segments or portions for implementing the codes of the executable instructions in the steps of a specific logic function or process, and the range of the preferred embodiments further includes other implementations, wherein the functions may be executed other than the order illustrated or discussed, including a substantially simultaneous manner based on concerned function or an inverse order, and this shall be appreciated by a person skilled in the art.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a computer-based system, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, electronic, magnetic, optical, electromagnetic, infrared or semiconductor system, device, apparatus, or a propagation medium. More detailed examples of the computer readable medium include (non-exhaustive list): an electrical connecting portion (electronic device) having one or more wirings, a portable computer disk (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It shall be understood that a person of ordinary skill in the art may prepare suitable computer codes to carry out each of the steps and processes described above and illustrated in the drawings. It shall also be understood that the above-described terminals, computers, servers, and networks, etc. may be any type, and the computer codes may be prepared according to the disclosed contents to carry out the present invention by using the devices.

Although particular features of the present invention are described with respect to only one or more of the illustrated embodiments, such features may be combined with one or more other features of other embodiments as desired and in consideration of advantageous aspects of any given or particular application.

Finally to be noted, the terms "comprise", "include" or any other variant intend to cover nonexclusive inclusions, so that a process, a method, an article or a device comprising a series of elements includes not only those elements, but also other elements not explicitly listed, or inherent elements of the process, the method, the article or the device.

The above contents of the present invention are given for illustration and description rather than exhaustively listing or limiting the present invention to the disclosed forms. Many modifications and changes are obvious for a person skilled in the art. The selected and described embodiments are performed to better explain the principle and practical application of the present invention, and enable a person skilled in the art to understand the present invention, thereby to design various embodiments suitable to particular purposes and having different modifications.

What is claimed is:

1. A method for conveying downlink scheduling signaling, comprising:
   generating a plurality of masking sequences corresponding to a plurality of predetermined downlink scheduling information including downlink physical resource assignment indicating information or power assignment information for a Demodulation Reference Signal (DMRS); and
   selecting a corresponding masking sequence from the plurality of masking sequences based on downlink scheduling information to be notified to a User Equipment (UE), and masking a Cyclic Redundancy Check (CRC) of a corresponding downlink control channel of the UE with the selected masking sequence for transmission.

2. The method according to claim 1, wherein the masking the CRC of the corresponding downlink control channel of the UE with the selected masking sequence comprises:
   performing an exclusive OR operation on the CRC of the corresponding downlink control channel of the UE using the selected masking sequence.

3. The method according to claim 1, wherein the downlink physical resource assignment indicating information comprises at least: one of physical resource reservation information and a pattern of the DMRS.

4. An apparatus for conveying downlink scheduling signaling, comprising:
   a masking sequence generating unit for generating a plurality of corresponding masking sequences based on a plurality of predetermined downlink scheduling information including downlink physical resource assignment indicating information or power assignment information for a Demodulation Reference Signal (DMRS); and
   a masking processing unit for selecting a corresponding masking sequence from the plurality of masking sequences based on downlink scheduling information to be notified to a User Equipment (UE), and masking a Cyclic Redundancy Check (CRC) of a corresponding downlink control channel of the UE with the selected masking sequence for transmission.

5. The apparatus according to claim 4, wherein the masking processing unit comprises:
   a masking selecting unit for selecting a corresponding masking sequence from the plurality of masking sequences based on downlink scheduling information to be notified to the UE; and
   a masking scrambling unit for performing an exclusive OR operation on the CRC of the corresponding downlink control channel of the UE using the selected masking sequence.

6. The apparatus according to claim 4, wherein the downlink physical resource assignment indicating information comprises at least: one of physical resource reservation information and a pattern of the DMRS.

7. A method for conveying downlink scheduling signaling, comprising:
   receiving a Cyclic Redundancy Check (CRC) masked with a masking sequence, from a downlink control channel of a base station;
   de-masking the received CRC of the downlink control channel, and determining the masking sequence masking the CRC of the downlink control channel; and
   obtaining downlink scheduling information for the determined masking sequence based on a pre-stored correspondence relationship between a plurality of masking sequences and a plurality of downlink scheduling information, wherein the downlink scheduling information comprises downlink physical resource assignment indicating information or power assignment information for a Demodulation Reference Signal (DMRS).

8. The method according to claim 7, wherein the de-masking the received CRC of the downlink control channel comprises of performing a traversal search for the plurality of masking sequences in the received CRC of the downlink control channel.

9. The method according to claim 7, wherein the downlink physical resource assignment indicating information comprises at least: one of physical resource reservation information and a pattern of the DMRS.

10. An apparatus for conveying downlink scheduling signaling, comprising:
    a receiving unit for receiving a Cyclic Redundancy Check (CRC) masked with a masking sequence, from a downlink control channel of a base station;
    a de-masking processing unit for de-masking the received CRC of the downlink control channel, and determining the masking sequence masking the CRC of the downlink control channel; and
    an obtaining unit for obtaining downlink scheduling information for the determined masking sequence based on a pre-stored correspondence relationship between a plurality of masking sequences and a plurality of downlink scheduling information, wherein the downlink scheduling information comprises downlink physical resource assignment indicating information or power assignment information for a Demodulation Reference Signal (DMRS).

11. The apparatus according to claim 10, wherein the de-masking processing unit performs a traversal search for the plurality of masking sequences in the received CRC of the downlink control channel, and determines a masking sequence masked with the CRC of the downlink control channel.

12. The apparatus according to claim 10, wherein the downlink physical resource assignment indicating information comprises at least: one of physical resource reservation information and a pattern of the DMRS.

* * * * *